US012671006B2

(12) United States Patent
Huclier et al.

(10) Patent No.: US 12,671,006 B2
(45) Date of Patent: Jun. 30, 2026

(54) METHOD FOR THE GENERATION OF SCANDIUM-44

(71) Applicant: Nantes Université, Nantes (FR)

(72) Inventors: Sandrine Huclier, Nantes (FR); Ferid Haddad, Sainte-Luce-Sur-Loire (FR)

(73) Assignee: Nantes Université, Nantes (FR)

( * ) Notice: Subject to any disclaimer, the term of this patent is extended or adjusted under 35 U.S.C. 154(b) by 458 days.

(21) Appl. No.: 18/252,984

(22) PCT Filed: Nov. 16, 2021

(86) PCT No.: PCT/EP2021/081843
§ 371 (c)(1),
(2) Date: May 15, 2023

(87) PCT Pub. No.: WO2022/101500
PCT Pub. Date: May 19, 2022

(65) Prior Publication Data

US 2023/0420153 A1 Dec. 28, 2023

Related U.S. Application Data

(60) Provisional application No. 63/114,190, filed on Nov. 16, 2020.

(30) Foreign Application Priority Data

Nov. 16, 2020 (EP) .................................... 20306383

(51) Int. Cl.
*G21G 1/00* (2006.01)

(52) U.S. Cl.
CPC ..... *G21G 1/001* (2013.01); *G21G 2001/0094* (2013.01)

(58) Field of Classification Search
None
See application file for complete search history.

(56) References Cited

FOREIGN PATENT DOCUMENTS

| | | | |
|---|---|---|---|
| WO | 2006074960 | A1 | 7/2006 |
| WO | 2020030659 | A1 | 2/2020 |

OTHER PUBLICATIONS

Filosofov et al., "A 44Ti/44Sc radioculide generator for potential application of 44Sc-based PET-radiopharmaceuticals", Radiochimica Acta, [Online] vol. 98, No. 3, Apr. 16, 2010, XP055788711.

(Continued)

*Primary Examiner* — Kara M Peo
(74) *Attorney, Agent, or Firm* — McDonald Hopkins LLC

(57) ABSTRACT

A method for generating $^{44}Sc$ from a target solution, includes the following steps: a step of solid-liquid extraction comprising (a) the precipitation of a target solution comprising metal species with fluoride ions, the target solution comprising at least $^{44}Sc$, $^{44}Ti$, and $^{46}Sc$ and other metal impurities, whereby a solution comprising a precipitate made essentially of $^{46}Sc$ is obtained, and (b) the filtration of the resulting solution and the recovering of the resulting filtrate comprising essentially $^{44}Sc$ and $^{44}Ti$; a step of solid-phase extraction chromatography comprising (c) the loading of the filtrate obtained by the previous step onto a preconditioned hydroxamate column, and (d) the elution of a hydrochloric acid solution through the preconditioned hydroxamate column, and a step of recovering $^{44}Sc$ from the elution of the previous step.

8 Claims, 1 Drawing Sheet

(56) References Cited

OTHER PUBLICATIONS

Extended European Search Report for European Application No. 20306383.9 dated Apr. 1, 2021.

Search Report for International Application No. PCT/EP2021/081843 dated mailed Feb. 24, 2022.

Rotsch D.A., Brown M.A., Nolen J.A., Brossard T., Henning W.H., Chemerisov S.D., Gromov R.G., Greene J. Electron linear accelerator production and purification of scandium-47 from titanium dioxide targets, Applied Radiation and Isotopes 131, 77 (2018).

Radchenko V., Engle J.W., Medvedev D., Maasen J.M. Naranjo C.M., Unc G.A., Meyer C.A.L., Mastren T., Brugh M., Mausner L., Cutler C.S., Birnbaum E.R., John K.D., Nortier M, Fassenberg M.E. Nucl. Med. Biol. 50, 25 (2017).

Pruszyski M, Loktionova N, Filosofov D, Roesch F. Post-elution processing of 44Ti/44Sc generator derived 44Sc for clinical application. Appl Radiat Isot;68:1636 (2010) and Rösch F. Scandium-44: benefits of a long-lived PET radionuclide available from the 44Ti/44Sc generator system. Curr Radiopharm;5:187 (2012).

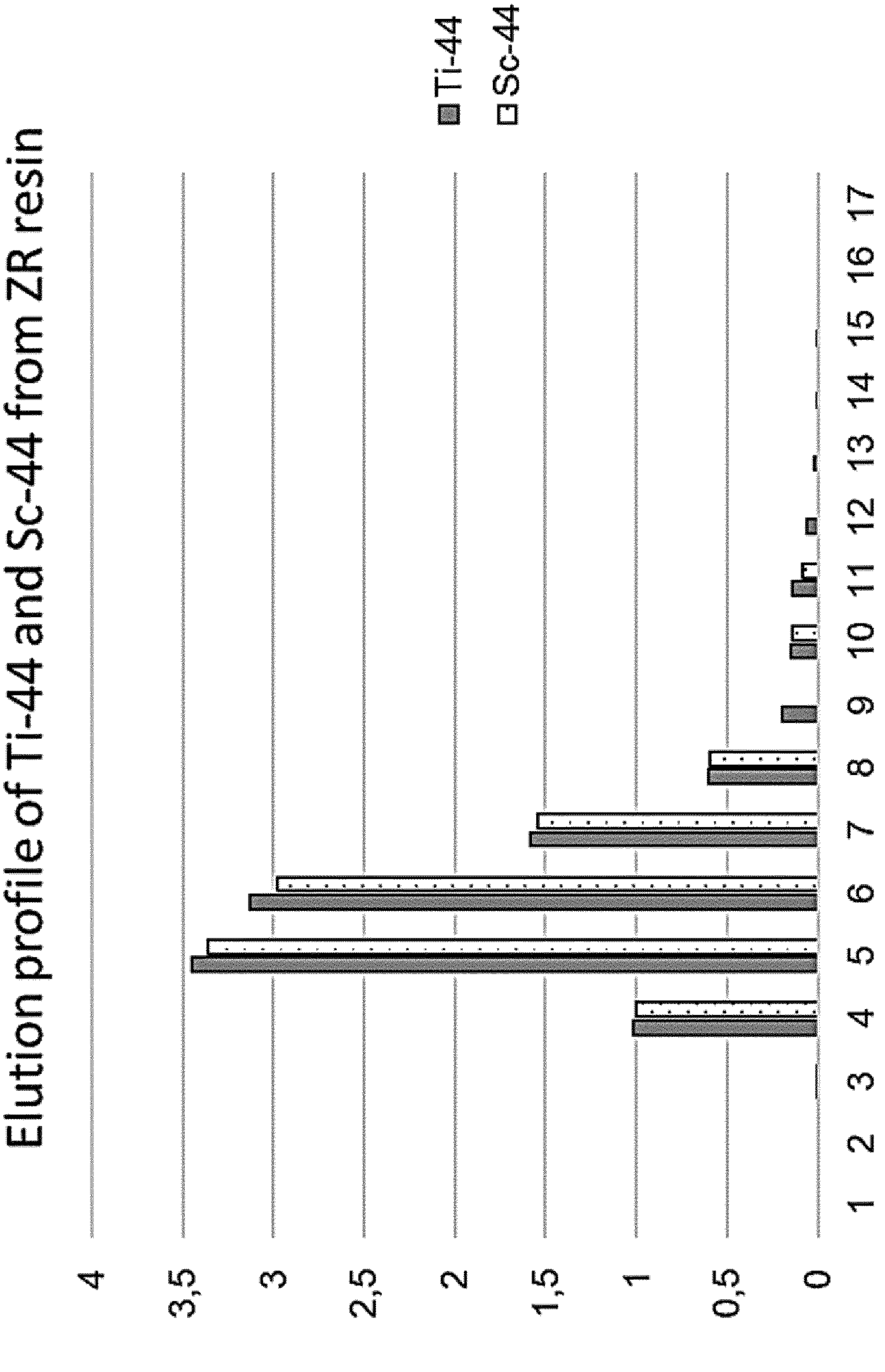
Elution profile of Ti-44 and Sc-44 from ZR resin
Ti-44
Sc-44
0
0,5
1
1,5
2
2,5
3
3,5
4
1 2 3 4 5 6 7 8 9 10 11 12 13 14 15 16 17

METHOD FOR THE GENERATION OF SCANDIUM-44

CROSS-REFERENCE TO RELATED APPLICATIONS

This is a National Stage application of PCT international application PCT/EP2021/081843, filed on Nov. 16, 2021, which claims priority from European Patent Application No. 20306383.9, filed on Nov. 16, 2020 and U.S. Provisional Patent Application No. 63/114,190, filed on Nov. 16, 2020 both which are incorporated herein by reference in their entirety.

The present invention concerns a method for the generation of $^{44}$Sc with high radionuclidic purity from $^{44}$Ti.

BACKGROUND OF THE DISCLOSURE

Scandium possesses two radionuclides emitting $\beta^+$ radiations ($^{44}$Sc or $^{43}$Sc) that become appropriate candidates in PET/CT diagnosis, due to the half-life of around 4 hours and decay to the non-toxic Ca. For both radionuclides, the half-life is compatible with the pharmacokinetics of a wide range of targeting vectors (such as peptides, antibody fragments and oligonucleotides). In 2010, the $^{44}$Sc radionuclide has been proposed by Rösch as a potential alternative for $^{68}$Ga in clinical PET diagnosis (Pruszyski M, Loktionova N, Filosofov D, Roesch F. Post-elution processing of $^{44}$Ti/$^{44}$Sc generator derived $^{44}$Sc for clinical application. Appl Radiat Isot; 68:1636 (2010) and Rosch F. Scandium-44: benefits of a long-lived PET radionuclide available from the $^{44}$Ti/$^{44}$Sc generator system. Curr Radiopharm; 5:187 (2012)). Many different extraction and separation methods have been described in the literature. From the initial Rösch's paper to more recent ones, the scandium chemistry has revealed a growing interest with an increasing number of papers available on scandium: from $^{44}$Ti/$^{44}$Sc generator, from neutron irradiated Ti, cyclotron produced $^{44m}$Sc/$^{44}$Sc, $^{nat}$Sc, $^{46}$Sc, or $^{47}$Sc.

With a mean positron energy of 0.6 MeV ideal for PET cameras, $^{44}$Sc makes it highly attractive for clinical PET application because its half-life enables transportation of $^{44}$Sc-labeled radiopharmaceuticals to hospitals that are located quite far away from the radiopharmaceutical production site. However, the co-emission of a high-energy $\gamma$-ray similar to 89 Zr, has to be taken into consideration. If not controlled, it may increase the radiation dose to the patient and staff. Many different ways have been investigated to produce $^{44}$Sc: mostly using cyclotrons, or generators.

One source of $^{44}$Sc is through the long-lived parent nuclide $^{44}$Ti ($T_{1/2}$=60 years), so-called $^{44}$Ti/$^{44}$Sc generator (Rotsch D. A., Brown M. A., Nolen J. A., Brossard T., Henning W. H., Chemerisov S. D., Gromov R. G., Greene J. Electron linear accelerator production and purification of scandium-47 from titanium dioxide targets, Applied Radiation and Isotopes 131, 77 (2018); Radchenko V., Engle J. W., Medvedev D., Maasen J. M. Naranjo C. M., Unc G. A., Meyer C. A. L., Mastren T., Brugh M., Mausner L., Cutler C. S., Birnbaum E. R., John K. D., Nortier M, Fassenberg M. E. Nucl. Med. Biol. 50, 25 (2017)). Titanium-44 is generated by proton irradiation via $^{45}$Sc (p, 2n) $^{44}$Ti reaction (Lange R., D'Auria J., Giesen U., Vincent J., Ruth T. Preparation of a radioactive $^{44}$Ti target. Nucl Instrum Methods Phys Res A, 423, 247 (1999)) or by spallation on $^{nat}$Fe or $^{nat}$Cu. It would have the ability to provide on a daily basis radiochemically pure $^{44}$Sc, i.e. with no $^{44m}$Sc obtained in contrast to the other production routes. Dedicated production runs require high beam currents and long irradiation times to be able to produce sufficient activities. [23]For instance, it has been shown that 150 MBq could be produced over 9 days irradiation at 220 μA, which allows eluting every 4 h up to 60 MBq (i.e. activity necessary for 1 imaging dose). This leads to high cost for the production and the necessity to have a regular and efficient use of the generator over a long period of time. The separation of $^{44}$Ti from scandium target material is not trivial, even if some progress have been made recently in this field. Finally, a generator system implies the development of an efficient separation with high $^{44}$Sc elution yields and minimal breakthrough of the parent $^{44}$Ti. In addition, the long half-life of $^{44}$Ti ($T_{1/2}$=60 years) would lead to difficult management of this generator in nuclear medicine services and a centralized pharmacy may be better suited to manage such a generator.

Several separation methods have been tested using DGA® resin, or ZR® resin. Radchenko et al. highlighted the fact that DGA resin could be used for Ti/Sc trace separations in the context of a fine purification of $^{44}$Ti from residual scandium target material (Lange R., D'Auria J., Giesen U., Vincent J., Ruth T. Preparation of a radioactive 44Ti target. Nucl Instrum Methods Phys Res A, 423, 247 (1999)). By contrast, ZR® resin was shown to exhibit a high sorption affinity for titanium, whereas scandium could be eluted with HCl solutions. Nonetheless, there are some drawbacks concerning this generator since some breakthrough of $^{44}$Ti has been observed after several bed elutions. This is particularly important for such a generator with an expected long shelf life. Filosofov et al. (Mausner L, Kolsky K, Joshi V, Srivastava S. Radionuclide development at BNL for nuclear medicine therapy. *App Rad Isot;* 49:285 (1998)) proposed to circumvent this issue by applying alternatively reverse eluting flows through the column. By using ZR® resin, Radchenko et al. have evidenced a lower breakthrough letting these authors envisaged a long-term use of this generator. Even so, as high activities could be loaded on these columns, leaching of the extractant molecules or deterioration of the sorption performances could occur with time. These effects have to be accurately studied as they may limit the duration of the use of the generator.

BRIEF SUMMARY

The aim of the present invention is thus to provide an efficient $^{44}$Ti/$^{44}$Sc generator system with high $^{44}$Sc elution yields and minimal breakthrough of the parent $^{44}$Ti.

The aim of the present invention is also to provide an efficient $^{44}$Ti/$^{44}$Sc generator system giving high chemical and radionuclidic purities.

The aim of the present invention is also to provide a generator making a short-lived radioisotope available locally and in a sustainable way, allowing PET imaging, having a long lifespan with ease and reliability of use, meeting high specifications for contaminants, and being able to avoid any breakthrough.

Therefore, the present invention relates to a method for generating $^{44}$Sc from a target solution, comprising the following steps:

a step of solid-liquid extraction comprising:

(a) the precipitation of a target solution comprising metal species with fluoride ions, said target solution comprising at least $^{44}$Sc, $^{44}$Ti, and $^{46}$Sc and other metal impurities, wherein the amount of Sc is from 10,000 to 15 000 ppm in relation to the total weight of said target solution, the amount of Ti is from 5 to 10 ppm in relation to the total weight of said target solution, and the amount of each metal impurity is from 200 to 300 ppm in relation to the total volume of said target solution, whereby a solution comprising a precipitate made essentially of $^{46}$Sc is obtained, (b) the filtration of the resulting solution and the recovering of the resulting filtrate comprising essentially $^{44}$Sc and $^{44}$Ti;

a step of solid-phase extraction chromatography comprising:

(c) the loading of the filtrate obtained by the previous step onto a preconditioned hydroxamate column, wherein said preconditioned hydroxamate column is obtained from the treatment of a hydroxamate column with a strong acid and rinsing with water, and (d) the elution of a hydrochloric acid solution through the preconditioned hydroxamate column, whereby $^{44}$Ti is adsorbed onto said column, and a step of recovering $^{44}$Sc from the elution of the previous step.

The method according to the invention for the generation of scandium-44 is thus based on the combination of solid-liquid extraction and solid-phase extraction chromatography.

The starting product is a target solution comprising metal species, in particular scandium and titanium, as well as metal impurities. This solution may also comprise other radionuclides.

In particular, this target solution may comprise Fe, Si, Mo, Pb, Al, Zn, and Ca.

BRIEF DESCRIPTION OF THE DRAWINGS

FIG. 1 represents the elution profile of Ti-44 and Sc-44 from ZR resin.

DETAILED DESCRIPTION

According to an embodiment, this target solution is prepared from a scandium disk previously. After its irradiation, the irradiated disk is cooled off and then dissolved in a solution of hydrochloric acid.

According to an embodiment, the target solution is prepared from a scandium disk previously irradiated for approximately 10 days at average current greater than 130 μA with an energy deposited on the Sc disk of 25-26 MeV.

The method according to the invention comprises the precipitation of the target solution with fluoride ions.

This precipitation step thus makes it possible to separate the various metal species from the solution depending on their solubility.

According to a preferred embodiment, the precipitation step (a) is carried out at an acid pH of less than 6.

This acidic pH is advantageous in that it avoids the formation of hydroxo species of scandium and of any other metallic impurities present in the resulting batch from dissolution of the target.

According to a preferred embodiment, for the precipitation step (a), the ratio between the concentration of all metal species and the concentration of fluoride ions is from 1:5 to 1:20, and preferably from 1:15 to 1:20.

More preferably, the ratio between the concentration of all metal species and the concentration of fluoride ions is from 1:17.

The above-mentioned ratio is preferred for an optimal precipitation. In particular, when this ratio is too low, no precipitation is obtained and when this ratio is too high, a too high amount of solid material is obtained.

According to a preferred embodiment, the precipitation step (a) is carried out for at least 24 hours at room temperature.

According to a preferred embodiment, the precipitation step (a) is carried out with a NaF solution.

After this precipitation step, a solution comprising a precipitate made essentially of $^{46}$Sc is obtained.

As explained above, the precipitation step is followed by a filtration step. This filtration step leads in particular to the recovering of the filtrate whereas the precipitate as defined above is discarded.

The initial solution is yellowish and acidic, whereas the resulting solution is a whitish gel-like solution.

The recovered filtrate comprises essentially $^{44}$Sc and $^{44}$Ti.

The solid-liquid extractions steps are followed by solid-phase extraction chromatography steps.

These steps include a step for conditioning of a hydroxamate column. This conditioning step is essential for the efficiency of the method according to the invention.

This allows optimizing the functions on the surface of the resins to promote the exchange of ions and thus obtaining the maximal ion exchange capacity. The resins are preferably conditioned with the first medium of use so that they are in equilibrium with the solution. This then avoids unwanted reactions (change in acidity, change in chloride concentration, . . . ).

According to the invention, a column of resin bearing an hydroxymate function is prepared.

According to the invention, for the conditioning, the hydroxamate column is treated with a strong acid such as hydrochloric acid and then rinsed with water.

According to the invention, a strong acid is an acid with a pK a value which is less than about −2. Preferably, said strong acid is selected from the group consisting of: nitric acid, sulfuric acid, hydrochloric acid, and mixtures thereof, and is preferably hydrochloric acid.

According to a preferred embodiment, the mass of the preconditioned hydroxamate column is comprised from 200 mg to 2 g.

According to a preferred embodiment, the preconditioned hydroxamate column is obtained from the elution of a hydroxamate column with a hydrochloric acid solution at a concentration from 1M to 10M followed by a rinsing with water, preferably pure water, and a further elution with a volume V1 from 20 mL to 100 mL of a hydrochloric acid solution at a concentration from 0.1M to 3M.

According to a preferred embodiment, the preconditioned hydroxamate column is obtained from the elution of a hydroxamate column with HCl 2M and rinsing with pure water. Preferably, it is then eluted with 20 mL of HCl 0.1 $mol \cdot L^{-1}$ to remove all potential metal impurities.

According to the invention, purified water is water that has been mechanically filtered or processed to remove impurities and make it suitable for use. One may cite distilled water as a form of purified water, but also water that is purified by other processes including capacitive deionization, reverse osmosis, carbon filtering, microfiltration, ultrafiltration, ultraviolet oxidation, or electrodeionization.

The preparation of the preconditioned hydroxamate column is followed by the loading of the filtrate (comprising essentially $^{44}$Sc and $^{44}$Ti) onto said column and said the elution of a hydrochloric acid solution through said column, whereby $^{44}$Ti is adsorbed onto said column.

At the end of this elution, $^{44}$Sc is recovered.

According to a preferred embodiment, the elution step (d) is carried out with a hydrochloric acid solution at a concentration from 1M to 5M with a volume V2 from 2 mL to 25 mL.

More preferably, for the elution step (d), the hydrochloric acid solution has a concentration of 2M.

More preferably, for the elution step (d), the volume V2 is comprised from 3 mL to 15 mL.

The resulting solution is radionucleidically and chemically pure for further radiolabeling; leading thus to high molar activity and high specific activity. These criteria are essential for further use of the solution as a radiopharmaceutical generator.

The present invention concerns a method for the separation of $^{44}$Ti from a larger scandium mass based on solid-liquid separation after precipitation with fluoride ions. By contrast to Radchenko et al. as mentioned above, the sorption/retention of $^{44}$Ti vs. scandium does not have to be taken into consideration since here the separation is based on the differences of the solubility products between Ti and Sc with fluoride ions.

The present method is based on the direct loading of the Ti after solid-liquid separation. The purity of the subsequent $^{44}$Sc eluted was monitored by the means of ICP-OES as explained later. The viability of the $^{44}$Ti/$^{44}$Sc generator was evaluated by doing radiolabeling studies. To this aim, DOTA (1,4,7,10-tetraazacyclododecane-1,4,7,10-tetraacetic acid) was used as chelating agent; the thermodynamically very stable complex was formed rather quickly and was kinetically inert (Huclier-Markai S., Alliot C., Sebti J., Brunel B., Aupiais J. A comparative thermodynamic study of the formation of Scandium Complexes with DTPA and DOTA, RSC Adv 5, 99606 (2015)). In addition, it was shown that the radioscandium from each source differs in molar activity commonly obtained and/or in cold metal ion impurity content. The calculated molar activity of the cyclotron $^{44m/44}$Sc was always higher than 20 MBq/nmol (4 h after end of beam). However for the generator $^{44}$Ti/$^{44}$Sc molar activity was estimated to be max. ~0.2 MBq/nmol (for DOTA; 4 h after end of elution) (Pniok M., Kubiček V., Havličková J., Kotek J., Sabatie A., Plutnar J., Huclier-Markai S., Hermann P. Thermodynamic and kinetic study of scandium (III) complexes of DTPA and DOTA: A step toward scandium radiopharmaceuticals. *Chem. Eur. J.* 20, 2 (2014)). The method of the invention thus reached higher molar activities on DOTA (i.e. 2 MBq/nmol).

EXAMPLES

Materials and Methods

Chemical Reagents

Nitric and hydrochloric acid were received as ultrapure solutions (SCP Science). Citric acid was purchased from Sigma Aldrich (Saint-Louis, USA). All dilutions were made in Ultrapure water (Millipore, 18.2 MΩ·cm). NaF was purchased from Baker Chemical Co (99.7% purity, Phillipsburg, NJ, USA) and was diluted in HCl 6M. Whatman syringe filters in polypropylene (PP) with a cut-off at 0.2 μm, connected to the corresponding 1 mL syringe were used as received.

The ZR® resin (hydroxamate groups) provided by Triskem (France) was first eluted with HCl 2M and rinsed with pure water. Then, it was eluted with 20 mL of HCl 0.1 mol·L$^{-1}$ to remove all potential metal impurities. Resins were loaded into Pierce Centrifuge column of 5 mL from ThermoFisher (USA). Commercially available 1,4,7,10-tetraazacyclododecane-1,4,7,10-tetraacetic acid (DOTA, Macrocyclics Inc.) was used as received.

Tartlet Design, Irradiation and Dissolution

Scandium spattering target disk (d×h=2.375×0.196 inches i.e. 6.0325 cm×4.9784 mm, m=43.3 g) was purchased from American Elements (Los Angeles, Ca, USA). For irradiation the disk was isolated in the Inconel can with 0.012 inch (0.3048 mm) windows, laser welded under Helium atmosphere. The target was irradiated at BLIP facility at Brookhaven National Laboratory for 10.4 days at average current 131.5 μA. The energy on Sc disk was calculated to be 25-26 MeV.

After irradiation the target was allowed cool off for at least 40 days and transferred to a Hot Cell for chemical processing. The target was opened by cutting out the windows and removing the scandium disk from the can. Sc disk was dissolved in an 800 ml glass beaker by adding 50 ml portions of HCl of various concentrations (4N, 6N, 12N) starting with 4N HCl. The total amount of added acid was 3.24 moles which amounted to a total volume of the resulting solution close to 400 ml. The solution was kept overnight undisturbed. The next day a small amount of fluffy residue on the bottom of the beaker was observed.

The Sc target solution was decanted into a plastic bottle. The remaining residue suspension was passed through an empty Biorad column, washed with 1N HCl and collected. All wash fractions were added to the Sc target solution and transferred to a glass beaker. The volume of the solution was reduced to 250-300 ml by evaporation. A total of 100 ml of 2N HCl was added to the solution to bring the volume back to 400 ml.

The solution was divided into two portions (200 ml and 190 ml) using graduated plastic bottles. The solutions were weighed. An aliquot was removed for gamma spectroscopy analysis. The 2 portions were processed separately.

The 200 ml portion passed through the 5 ml (1.424 g) bed volume ZR® resin (Triskem, France) pretreated with a few column volumes of 2N HCl. The load was collected in 30-40 ml fractions. The column was washed with 30 mL of 2N HCl. The column was eluted with 2.5 $H_2O_2$-2NHCl solution into 3 fractions of 40 mL, 45 mL, and 20 mL respectively. All loaded, elution, and washed fractions were assayed using gamma spectroscopy by removing precise aliquot of the fraction.

The 190.4 ml portion was processed similarly except a 7 ml bed volume column was used and fraction sizes for elution were adjusted based on the results of the processing of the first 200 ml fraction.

The elutions from both processes were combined and evaporated to dryness. The residue was resuspended in 6N HCl to give a total volume of 56.7 ml. The total activity produced was roughly 873 μCi. Three aliquots were taken from this solution. A first aliquot of 1004 was taken to perform the initial ICP-OES analysis as well as the gamma spectrometry analysis. The other two aliquots were of 1 mL (corresponding to 15.4 μCO were taken to assess the direct loading onto a ZR® resin after precipitation.

Gamma Spectrometry

Gamma-ray spectrometry was performed by the means of an HPGe detector GEM 13180-P10 from ORTEC (Oak Ridge, TN, USA) with a relative efficiency of 10% at 1333 keV. Detector response function determination was performed using standards of radionuclides containing mixtures of $^{241}$Am, $^{109}$Cd, $^{57}$Co, $^{139}$Ce, $^{203}$Hg, $^{113}$Sn, $^{137}$Cs, $^{88}$Y and $^{60}$Co traceable to NIST and supplied by Eckert and Ziegler (Atlanta, GA, USA).

Titanium-44 was measured using its gamma rays at 68 and 78 keV whereas Scandium-44 was analyzed by its gamma-ray at 1157 keV. Throughout the separation process, both elements were monitored through these gamma rays.

ICP-OES

Determination of stable contaminants are measured by the means of Inductively Coupled Plasma Atomic Emission Spectroscopy (ICP-AES) using a Perkin Elmer Instrument. Single and multi-elements standards (about 10 ppm SCP Science) were used for the calibration of ICP-OES. Analysis were performed in triplicate and based on a 50 sec sample exposure time. Data are analyzed using WinSpec software. The following elements were monitored: Al, As, Ca, Co, Cr, Cu, Cd, Fe, Mg, Mn, Mo, Na, Ni, Pb, Sb, Sc, Si, Sn, Ta, Ti, V and Zn.

Precipitation and Solid-Liquid Separation

In order to discard macro-amounts of scandium contained in the dissolved-target batch from trace amounts of titanium-44, a NaF solution at 4.7 M was added to the target solution batch. The dilution factor of the initial batch was ⅓ that was shown to be sufficient to induce the precipitation reaction of Scandium and to not having a too large volume to further proceed with the loading of $^{44}Ti/^{44}Sc$ generator onto resin column. In these conditions, the chances to form $TiF_4$ precipitate are extremely low since it could be formed only in drastic conditions (T°>400° C.+HF gas under high pressure).

$$Sc^{3+} + 3F^{-} \leftrightarrows ScF_3 \quad \text{Eq. 1}$$

$$\text{At equilibrium @ } 20°\text{ C. } K_s=[Sc^{3+}]_{eq}[F^-]^3_{eq}=5.81\cdot10^{-24} \quad \text{Eq. 2}$$

At any time t of the reaction for given experimental conditions, $$Q_{sp}=[Sc^{3+}]_t\times[F^-]_t^3 \quad \text{Eq. 3}$$

To lead to precipitation, $Q_{sp}>K_{sp}$ (from Eq. 2 and Eq. 3).

The solution was let to reach equilibrium for 24 h and then a solid-liquid separation was performed by filtrating the resulting suspension through a centrisart filter. The filtrate was then used for dynamic separation on resin columns. The filter was rinsed with conc. HCl and this rinsing solution was then analyzed by gamma spectrometry. A 1 mL aliquot of this rinsing was taken and put in 10 mL of $HNO_3$ (2% w/v) for ICP-OES analysis.

Dynamic Column Separations

The method that was scrutinized the direct loading onto a ZR® resin of the Ti solution after solid-liquid separation.

This method was tested and optimized on low activity batches (≈3 μCi). After each step, fractions were analyzed by gamma spectrometry to assess the activity and the radionuclidic purity. An aliquot of 100 μL of each fraction was taken to be analyzed by ICP-OES to determine the chemical purity of the eluted fractions.

Single-Step Procedure: Direct Loading on ZR® Column 220 mg of ZR® resin were weighted for being conditioned as described above. The filtrate from precipitation was loaded onto the ZR column in HCl 6M. The elution has been run with 10 mL HCl 2M. The fractions were collected mL by mL and analyzed by gamma spectrometry to assess the activity and the radionuclidic purity. An aliquot of 100 μL of each fraction was taken to be analyzed by ICP-OES to determine the chemical purity of the eluted fractions.

Application of the Protocol to a 10 μCi Generator

A 9.7 μCi aliquot of the initial solution was evaporated to dryness and dissolved again in 1 mL of HCl 2M. The resulting solution was then directly loaded onto a ZR® column, corresponding to 1.6 g of ZR® resin pre-conditioned as described above. The elution has been run with 10 mL HCl 2M. The fractions were collected mL by mL and analyzed by gamma spectrometry to assess the activity and the radionuclidic purity. An aliquot of 100 μL of each fraction was taken to be analyzed by ICP-OES to determine the chemical purity of the eluted fractions.

Radiolabeling Studies

To 450 μL of solution of DOTA (i.e. 10 nmol, Macrocyclics Inc.) were added 50 μL (i.e. 2 nmol) of $^{44}Sc$ and mixed in a 2 mL screw-Cap Wheaton V-bottom vial. The solution was placed in a boiling water bath at 90° C. for 20 min and then cooled till room temperature was reached. To test the radiolabelling yield, a radio-TLC was performed by spotting 2 μL onto a TLC Flex Plate (silica gel 60A, F-254, 200 μm, Selecto Scientific) and eluted with a developing solution of 0.04 $mol\cdot L^{-1}$ aqueous $NH_4OAc$/Methanol, 50/50 (v/v). The activity distribution on the plates was assessed by counting for 20 min on a BIOSCAN AR 2000 (BIOSCAN).

Results and Discussion

Precipitation and Solid-Liquid separation

As recently highlighted by Radchenko et al. ( ), the radiochemical separation of $^{44}Ti$ from irradiated scandium does not require rapid chemistry due to the long half-life of $^{44}Ti$ ($T_{1/2}$=60.0 a). On the other hand, any efficient separation strategy should diminish losses of valuable $^{44}Ti$. Based on these two principles, they developed a methodology based on cationic exchange resins. But their conclusions were that both branched DGA (BDGA) and ZR (hydroxamate) resins hold promise for efficient and fast Ti/Sc separations. Since BDGA strongly sorbs scandium, it should preferably be used for $^{44}Ti$ fine purification in the absence of larger scandium amounts. ZR hydroxamate, on the other hand, proved to be highly suitable for the recovery of no carrier added $^{44}Ti$ from the bulk scandium matrices. But after 40 column bed volume elutions, with direct elution, this generator concept showed increasing levels of $^{44}Ti$ breakthrough, from ~20 Bq to ~80 Bq (a four-fold increase) [21]. Optimal $^{44}Ti$ load activity placement could likely result in even lower breakthrough levels. Long-term performance of this prototypical system remains to be addressed.

According to the present invention, a different sequence was employed; based on precipitation first; then a solid-liquid extraction and finally cation exchange like Radchenko et al.

Before any further process, there was a need of identification and quantification of the metallic impurities that were present in the initial batch from the target dissolution. The ICP-OES analysis indicated that Sc amount was about 13 345 ppm whereas Ti concentration was about 7 ppm. The other metallic impurities that were contained in the batch are given in Table 1 together with the corresponding concentrations.

| Element | Concentration in ppm |
|---|---|
| Sc | 13345 |
| Ti | 7 |
| Ta | 163 |
| Fe | 58.2 |
| Si | 13.7 |
| Mo | 9.6 |
| Pb | 8.6 |
| Al | 3.8 |

-continued

| Element | Concentration in ppm |
|---|---|
| Zn | 2.9 |
| Ca | 1.8 |

Additionally, a gamma spectrometry analysis was performed and it was shown that activation products, namely $^{46}$Sc, $^{88}$Y, or $^{88}$V, were present in the initial batch. Except for $^{46}$Sc, the activities measured of $^{88}$V and $^{88}$Y were quite low in comparison to the overall activity of $^{44}$Ti. Traces of $^{51}$Cr, $^{54}$Mn and $^{57}$Co were detected but were lower than the quantification limits. Based on these results and since the chemical and radionuclidic purities were not meeting the requirements; a further refinement of the purification process was necessary. The main goal was to recover the low concentrations of $^{44}$Ti when leaving apart $^{46}$Sc in macro quantities. From literature (Gile, J. D., Garrison, W. M. and Hamilton J. G. Carrier-free Radioisotopes from Cyclotron Targets XIII. Preparation and Isolation of Sc 44, 46, 47, 48 from titanium. The Journal of Chemical Physics 18, 1685 (1950)) and Walter R. I., Preparation of carrier-free scandium and vanadium activities from titanium cyclotron targets. J. Inorg. Nucl. Chem., 6, 63-66 (1958)), carrier-free $^{46}$Sc was separated in high yield from titanium by filtration of the Sc radiocolloid formed. In these papers, the Sc colloid was formed by adding ammonia to a solution of titanium peroxide complex. More recently, Bokhari et al. (Bokhari T. H., Mushtaq A., Khan I. U. Separation of no-carrier-added radioactive scandium from neutron irraditaed titanium. J. Radioanal. Nucl. Chem, 283, 389-393 (2010)) have prepared radioactive scandium by irradiating titanium targets, dissolving these targets in HF and then by separating the radioactive scandium from titanium fluoride on a silica gel. In the very recent review from Pyrzynska et al., it was mentioned that scandium could be stripped away by high concentrations of strong mineral acids, basic solutions or fluoride salts by forming ScF 3 precipitation. So based on all these data, the separation/purification process according to the present invention is based on the differences of solubility products. This step was not realized in the recent procedure described by Radchenko et al. The precipitation reaction was run on the initial batch by adding NaF solution. From the Handbook of Chemistry, the solubility of NaF is about at 20° C. but an oversaturated solution could be prepared. Thus, a solution of NaF at 4.7 M was prepared. The desired volume of this solution was added to the initial batch of $^{44}$Ti/$^{44}$Sc. The total volume added corresponded to maximum half of the initial volume of the batch, in order to limit the dilution by a factor of ⅓. In addition to this, since the pKa value of $HF/F^-$ is 3.2; and since the initial batch is in the acidic pH range (<2), only $F^-$ species would be present in solution. For Ti species, especially if a $TiF_4$ precipitate must be considered, drastic conditions are required to form it (i.e. T°>400° C., within HF gaz flow and high pressures). Chances to form this complex in the experimental conditions chosen (i.e. RT and atmospheric pressure) are very low since these drastic conditions could not be reached in the experimental conditions of the present work. In these conditions, we are quite sure to discriminate Ti from Sc. Preliminary experiments have shown that the optimum conditions for the precipitation reaction were reached for $F^-$ to metal ratio >10:1 (best conditions obtained for 12:1 ratio) and in acidic conditions (pH<2). It should be noticed that $NH_4OH$ could be added, leading to the formation of bigger amounts of precipitate, but it would correspond mostly to $TiO_2$ form instead of Ti(III). The solution was left at RT for 24 hrs to reach equilibrium. It was shown that this time was sufficient to reach the equilibrium. As a result, the equilibrated solution was filtrated through a 0.2 μm PP Whatman filter. An aliquot of 1004 of the filtrate, completed to 1 mL with $HNO_3$ 1%, was analyzed by gamma spectrometry showing that only $^{44}$Ti and $^{44}$Sc were present in solution (due to the decay). The filter itself was also analyzed by gamma spectrometry, even if this geometry was not calibrated on the gamma spectrometer. This measurement brought a qualitative information, notably, the filter contained only $^{46}$Sc and $^{44}$Sc with regards to other radionuclides (i.e. no $^{44}$Ti was detected). The same sample was completed to 5 mL with the addition of $HNO_3$ 1% and was analyzed by ICP-OES to measure the stable metallic impurities contained in the solution. It was shown that Fe, Zn, Ca and Ta were the main impurities remaining in the filtrate after the precipitation/filtration.

In order to reach high volumic and high molar activities, to meet radiopharmaceutical use requirements, the method of the invention was thus envisaged for a fine refinement of the filtrate and the loading of the generator.

Dynamic Column Separations

1. Determination of the Most Suitable Protocol

Method #1: 2-Steps Procedure: I) Purification on DGA® Column and ii) Loading on ZR® Column In the procedure described here, it was decided to first proceed with a further purification of the sample before loading $^{44}$Ti to establish a generator. This purification is based on the procedure described by Alliot et al. (Huclier-Markai S, Sabatie A, Ribet S, Kubicek V, Paris M, Vidaud C et al. Chemical and biological evaluation of scandium (III)-polyaminocarboxylate complexes as potential PET agents and radiopharmaceuticals. *Radiochim Acta;* 99:653 (2011)) for the production of $^{44}$Sc from a cyclotron. DGA has been used in several works dealing with scandium isotopes purification process. To this aim, a DGA column was set-up. To remind, 200 mg of DGA® resin (Triskem) was weighted and pre-conditioned with NaOH 1M, rinsed with water and finally reconditioned with HCl 2M. The $^{44}$Ti/$^{44}$Sc filtrate solution from the precipitation reaction was eluted through a column. The fraction were collected mL by mL by eluting first with HCl solution at 10M (up to 17 mL) and then with HCl 2M. To monitor the radionuclidic purity, a gamma spectrometry analysis was performed on each the fraction collected (mL). The very first 2 mL were discarded after ensuring that no radionuclide were present. $^{44}$Ti was fully recovered in fraction 3 to 17 using HCl 10M solution. The gamma spectrometry analysis showed that no $^{46}$Sc, neither other radionuclidic impurities were present in these eluted fractions. Only $^{44}$Ti was present in these fractions, or depending on the analysis time, its decay product $^{44}$Sc was also present. Fractions 1, 2 and 17 were analyzed by ICP-OES in order to monitor the chemical purity. It was shown that only Na was present, all the other metallic impurities were lower than the detection level. From Horwitz et al. (Dr. E. Philip Horwitz, Daniel R. McAlister & Anil H. Thakkar (2008) Synergistic Enhancement of the Extraction of Trivalent Lanthanides and Actinides by Tetra-(n-Octyl)Diglycolamide from Chloride Media, Solvent Extraction and Ion Exchange, 26:1, 12-24, DOI: 10.1080/07366290701779423), the elution of other chemical impurities (i.e. Al, Fe, . . . ) could be proceed then by using HCl 2M while Ti remained on the column. Elution was performed in these conditions up to 50 mL. Fractions were analyzed by gamma spectrometry showing the absence of any radionuclide. The chemical analysis showed neither the presence of stable metallic impurities. The overall chemical purity after the DGA column was thus excellent.

To established a $^{44}Ti/^{44}Sc$ generator, as initially described by Rösch (Pruszyski M, Loktionova N, Filosofov D, Roesch F. Post-elution processing of $^{44}Ti/^{44}Sc$ generator derived $^{44}Sc$ for clinical application. Appl Radiat Isot; 68:1636 (2010)), $^{44}Ti$ must be adsorbed on a resin. In the original work, a cationic exchanger AG50WX8 resin was used. The same idea was developed by Radchenko et al. but these authors used an alternative approach using hydroxamate based ZR Resin®. Since the equilibrium distribution coefficients of Ti and Sc were described in these papers, the same approach was employed in the second step of this work.

A fraction of 3.1 μCi from the DGA elution was taken and loaded on 220 mg of ZR resin, pre-conditioned with HCl 2M. The elution of $^{44}Sc$ was then performed by using a solution of HCl at 2M. The very first 2 mL were discarded after ensuring that there were no radionuclide contained in these fractions. The elution was continued with another 10 mL of HCl 2M, collecting the fractions mL by mL. Fractions were analyzed by gamma spectrometry. No $^{44}Ti$ breakthrough was observed.

100% of the loaded activity (measured with $^{44}Sc$) was recovered right away for the first elution and was the same after 24 hrs. No additional metallic impurities neither radionuclidic impurities were evidenced in eluted fractions after 24 hrs. The resulting molar activity was estimated to be 0.15 μCi/nmol=5.3 kBq/nmol. This was due to the low amount of radioactivity loaded on the column. This results leads the inventors to envisage the Method #2 (corresponding to the method according to the invention).

Method #2: Single-Step Procedure: Direct Loading on ZR® Column.

After the precipitation/filtration, an aliquot of 3.5 μCi was directly loaded onto a preconditioned ZR resin, based on the result from Method #1. Radionuclidic purity of this aliquot was quite good containing $^{44}Ti$, $^{44}Sc$ and few traces of $^{88}V$ and $^{88}Y$. In the filtrate before loading, ICP-OES analysis indicated that Fe, Mo, Si, (Zr) and Ta were the major impurities contained, and Al, Ca, Cu, Ni, Zn were present in lower concentrations. The elution was then performed by HCl 2M. Some $^{44}Ti$ was eluted in the very first 2 mL corresponding to 2.8% of the initial activity loaded; but after 24 h, no more 44Ti was released from the column. All $^{44}Sc$ was eluted within 10 mL of HCl 2M representing 97% of the initial activity loaded in $^{44}Ti$. After 24 h, another elution was run indicating the same percentage of elution with no $^{44}Ti$ present in any fraction. Nonetheless, it could be noticed that 75% of the initial activity loaded was recovered in 4 mL (about 2.6 μCi). The resulting volume activity was 0.64 μCi/mL. In the eluted fraction, it was shown that no other metallic impurities were present in the eluate (concentrations lower than the detection limits). The resulting molar activity will be estimated with the radiolabeling studies.

2. Application to a 10 μCi Generator

It was decided thus to gather fractions 3 to 17 from HCl 10M elution on DGA column to get approximately 10 μCi. These fractions were evaporated to dryness by the means of an epiradiator and redissolved in 500 μL of HCl 1M. The total activity was 9.7 μCi. These 9.7 μCi were loaded on 1.5 g of ZR resin, pre-conditioned with HCl 2M. The elution of $^{44}Sc$ was then performed by using a solution of HCl at 2M. The very first 3 mL were discarded after ensuring that there were no radionuclide contained in these fractions. The elution was pursued with another 12 mL of HCl 2M, collecting the fractions mL by mL. Fractions were analyzed by gamma spectrometry. The $^{44}Ti$ breakthrough was approx. ≈0.2% of the total activity in all fractions cumulated.

65% of the loaded activity (measured with $^{44}Sc$) was recovered right away from the first elution and was shown to be higher than 95% after 24 hrs.

Fe, Al, Zn metallic impurities were eluted directly in the first elution from ZR-resin loaded generator. No additional metallic impurities neither radionuclidic impurities were evidenced in eluted fractions after 24 hrs. The resulting molar activity was estimated to be 75.2 μCi/nmol=2.8 MBq/nmol.

Radiolabeling Studies

The set-up of a $^{44}Ti/^{44}Sc$ generator loaded on a ZR resin according to the invention was done allowing direct radiolabeling with DOTA ligand. The chelating ligand DOTA binds to transition and rare earth metal ions with a high stability under physiological conditions, leading to its use in vivo. The overall percentage of radiolabelled DOTA was found to be 90% for a 1:1 Sc:L molar ratio whereas it was 98% for a Sc:L molar ratio of 1:2. Even if these data are very well known, they were important to get an access to the specific activity of the resulting generator loaded. From the 9.7 μCi generator, this specific activity calculated was 54 μCi/nmol=2 MBq/nmol. This specific activity was higher than the one determined on the established $^{44}Ti/^{44}Sc$ generator from Röesch for which it was estimated to be about 0.2 MBq/nmol. In comparison to other sources of $^{44}Sc$, notably from a cyclotron production, this specific activity was lower than the one determined on $^{44m/44}Sc$ for which it was shown a specific activity f 37 MBq/nmol.

In conclusion, the present invention concerns the production of a substantial quantity of $^{44}Ti$ by proton irradiation of scandium targets at BNL proton accelerator plants and for the production of $^{44}Ti/^{44}Sc$ generators. The PET imaging isotope $^{44}Sc$ can be supplied daily by a $^{44}Ti/^{44}Sc$ generator. An efficient and easy method is implemented to recover Ti no-carrier-added from 13 g of Sc. This procedure comprises three steps: first, a fine separation of $^{44}Ti$ by precipitation with fluoride; second, a cation exchange step in HCl media for $^{44}Ti$ fine purification from residual Sc mass but from remaining metallic contaminants as well; and, third, cation exchange to load the generator. In summary, this method yielded a 90% of $^{44}Ti$ recovery. The resulting molar activity on a DOTA ligand was shown to be higher than the estimated molar activity published on the other $^{44}Ti/^{44}Sc$ generator (i.e. 2 MBq/nmol vs 0.2 MBq/nmol). This molar activity will be increased by the fact of increasing the activity since the chemical and radionuclidic purities reached in this method were good.

Comparative Example: Effect of the Conditioning of the Resin

For ZR resin, as mentioned above, tests were done with NaOH and then rinsing with water and reconditioning of the resin with HCl 2M.

However, 3 issues were noted:

Issue 1: an important amount of Si (>12 ppm) was eluted from the resin (colloids in the lungs, liver . . . )

Issue 2: The resin is getting brown when loading the generator. This is probably due to a degradation of the functional groups at the surface of the resin. It could be explained as well by the high concentration of acid used for loading the column (10M that is too much).

Issue 3: Ti and Sc are eluted together (see FIG. 1). It thus appears that the column is totally inefficient since it does not retain $^{44}Ti$ (it thus cannot be used as a generator).

The invention claimed is:

1. A method for generating 44Sc from a target solution, comprising the following steps:

a step of solid-liquid extraction comprising:

(a) precipitating a target solution comprising metal species with fluoride ions, said target solution comprising at least 44Sc, 44Ti, and 46Sc and other metal impurities, wherein the amount of Sc is from 10,000 to 15 000 ppm in relation to the total weight of said target solution, the amount of Ti is from 5 to 10 ppm in relation to the total weight of said target solution, and the amount of each metal impurity is from 200 to 300 ppm in relation to the total volume of said target solution, whereby a solution comprising a precipitate made essentially of 46Sc is obtained, (b) filtrating the resulting solution and recovering a resulting filtrate comprising essentially 44Sc and 44Ti;

a step of solid-phase extraction chromatography comprising:

(c) loading the filtrate obtained by the previous step onto a preconditioned hydroxamate column, wherein said preconditioned hydroxamate column is obtained from the treatment of a hydroxamate column with a strong acid and rinsing with water, and (d) eluting a hydrochloric acid solution through the preconditioned hydroxamate column, whereby 44Ti is adsorbed onto said preconditioned hydroxamate column, and a step of recovering 44Sc from the elution of the previous step.

2. The method of claim 1, wherein step (a) is carried out at an acid pH of less than 6.

3. The method of claim 1, wherein, for step (a), the target solution has a ratio between the concentration of all metal species and the concentration of fluoride ions from 1:5 to 1:20.

4. The method of claim 1, wherein step (a) is carried out for at least 24 hours at room temperature.

5. The method of claim 1, wherein step (a) is carried out with a NaF solution.

6. The method of claim 1, wherein the preconditioned hydroxamate column has a mass comprised from 200 mg to 2 g.

7. The method of claim 1, wherein the preconditioned hydroxamate column is obtained from the elution of a hydroxamate column with a hydrochloric acid solution at a concentration from 1M to 10M followed by a rinsing with water and a further elution with a volume V1 from 20 mL to 100 mL of a hydrochloric acid solution at a concentration from 0.1M to 3M.

8. The method of claim 1, wherein step (d) is carried out with the hydrochloric acid solution at a concentration from 1M to 5M with a volume V2 from 2 mL to 25 mL.

* * * * *